(12) United States Patent
Wang

(10) Patent No.: US 10,976,504 B2
(45) Date of Patent: *Apr. 13, 2021

(54) RUGGEDIZED FEMALE FIBER OPTIC CONNECTOR CABLE ASSEMBLY

(71) Applicant: COMMSCOPE TECHNOLOGIES LLC, Hickory, NC (US)

(72) Inventor: Liming Wang, Shanghai (CN)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/670,318

(22) Filed: Oct. 31, 2019

(65) Prior Publication Data
US 2020/0142138 A1 May 7, 2020

Related U.S. Application Data

(63) Continuation of application No. 16/085,430, filed as application No. PCT/US2017/022059 on Mar. 13, 2017, now Pat. No. 10,502,907.

(30) Foreign Application Priority Data

Mar. 14, 2016 (CN) .......................... 201610145037.2

(51) Int. Cl.
*G02B 6/38* (2006.01)
(52) U.S. Cl.
CPC ......... *G02B 6/3877* (2013.01); *G02B 6/3825* (2013.01); *G02B 6/3849* (2013.01); *G02B 6/3887* (2013.01); *G02B 6/3893* (2013.01); *G02B 6/3897* (2013.01); *G02B 6/3846* (2013.01); *G02B 6/3875* (2013.01); *G02B 6/3894* (2013.01)

(58) Field of Classification Search
None
See application file for complete search history.

(56) References Cited

U.S. PATENT DOCUMENTS

RE31,515 E * 2/1984 Heldt ................... G02B 6/3835
385/78
5,212,752 A 5/1993 Stephenson et al.
(Continued)

FOREIGN PATENT DOCUMENTS

CN 103713362 A 4/2014
JP 2005-010477 A 1/2005
(Continued)

OTHER PUBLICATIONS

International Search Report and Written Opinion of the International Searching Authority for International Patent Application No. PCT/US2017/022059 dated May 22, 2017, 8 pages.
(Continued)

*Primary Examiner* — Rhonda S Peace
(74) *Attorney, Agent, or Firm* — Merchant & Gould P.C.

(57) ABSTRACT

The present disclosure relates to a ruggedized female fiber optic connector designed to reduce cost. In one example, features of a fiber optic connector and a fiber optic adapter are integrated into one assembly. In another example, a female ruggedized optic connector is provided with a simple structure having a pre-assembled ferrule alignment sleeve including a ferrule.

20 Claims, 17 Drawing Sheets

(56) References Cited

U.S. PATENT DOCUMENTS

| | | | |
|---|---|---|---|
| 5,317,663 A | 5/1994 | Beard et al. | |
| 5,719,977 A | 2/1998 | Lampert et al. | |
| 5,778,122 A | 7/1998 | Giebel et al. | |
| 5,892,870 A | 4/1999 | Fingler et al. | |
| 6,542,674 B1 | 4/2003 | Gimblet | |
| 7,264,402 B2 | 9/2007 | Theuerkorn et al. | |
| 7,277,614 B2 | 10/2007 | Cody et al. | |
| 7,428,366 B2 | 9/2008 | Mullaney et al. | |
| 7,467,896 B2 | 12/2008 | Melton et al. | |
| 7,469,091 B2 | 12/2008 | Mullaney et al. | |
| 7,686,519 B2 | 3/2010 | Lu | |
| 7,744,286 B2 | 6/2010 | Lu et al. | |
| 7,744,288 B2 | 6/2010 | Lu et al. | |
| RE42,522 E | 7/2011 | Zimmel et al. | |
| 8,556,520 B2 | 10/2013 | Elenbaas et al. | |
| 9,513,444 B2 | 12/2016 | Barnette, Jr. et al. | |
| 9,696,500 B2 | 7/2017 | Barnette, Jr. et al. | |
| 9,766,414 B2 * | 9/2017 | Marcouiller | G02B 6/3879 |
| 9,915,789 B2 | 3/2018 | Beier et al. | |
| 10,126,508 B2 * | 11/2018 | Compton | G02B 6/387 |
| 10,133,019 B2 * | 11/2018 | Kowalczyk | G02B 6/4285 |
| 10,288,820 B2 | 5/2019 | Coenegracht | |
| 10,502,907 B2 * | 12/2019 | Wang | G02B 6/3897 |
| 2002/0191919 A1 | 12/2002 | Nolan | |
| 2006/0127026 A1 | 6/2006 | Beck | |
| 2006/0147172 A1 | 7/2006 | Luther et al. | |
| 2006/0269208 A1 | 11/2006 | Allen et al. | |
| 2008/0310796 A1 | 12/2008 | Lu | |
| 2011/0265521 A1 | 11/2011 | Tamekuni et al. | |
| 2013/0051731 A1 | 2/2013 | Belleville et al. | |
| 2013/0121653 A1 | 5/2013 | Shitama et al. | |
| 2013/0183002 A1 | 7/2013 | Maesoba et al. | |
| 2014/0219621 A1 | 8/2014 | Barnette, Jr. et al. | |
| 2014/0241670 A1 | 8/2014 | Barnette, Jr. et al. | |
| 2015/0268434 A1 | 9/2015 | Barnette, Jr. et al. | |
| 2017/0176693 A1 | 6/2017 | Kaplan | |
| 2018/0267243 A1 | 9/2018 | Nhep et al. | |
| 2018/0372963 A1 | 12/2018 | Bar-Hai et al. | |
| 2019/0101709 A1 | 4/2019 | Wang | |
| 2020/0142138 A1 * | 5/2020 | Wang | G02B 6/3893 |

FOREIGN PATENT DOCUMENTS

| | | |
|---|---|---|
| JP | 2005-084138 A | 3/2005 |
| JP | 2013-088462 A | 5/2013 |
| WO | 02/052310 A2 | 7/2002 |
| WO | 2006/113726 A1 | 10/2006 |
| WO | 2014/049469 A1 | 4/2014 |
| WO | 2014/123940 A1 | 8/2014 |
| WO | 2014/167447 A1 | 10/2014 |
| WO | 2014/197894 A1 | 12/2014 |
| WO | 2015/028433 A1 | 3/2015 |
| WO | 2016/156610 A1 | 10/2016 |

OTHER PUBLICATIONS

Extended European Search Report for corresponding European Patent Application No. 17767253.2 dated Oct. 9, 2019, 11 pages.

* cited by examiner

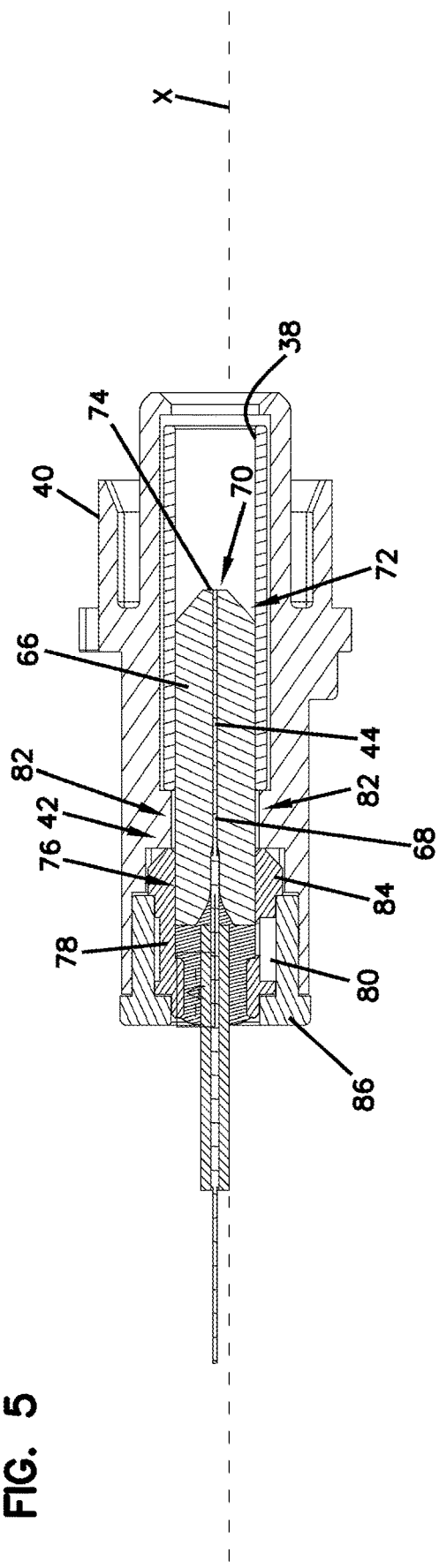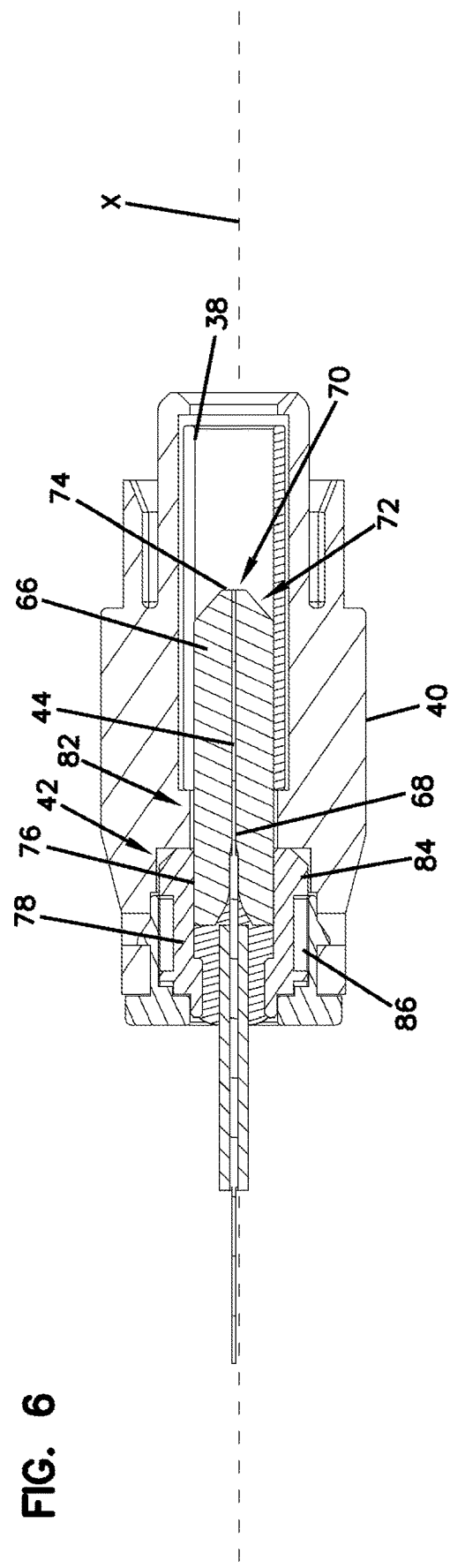

FIG. 20
FIG. 21
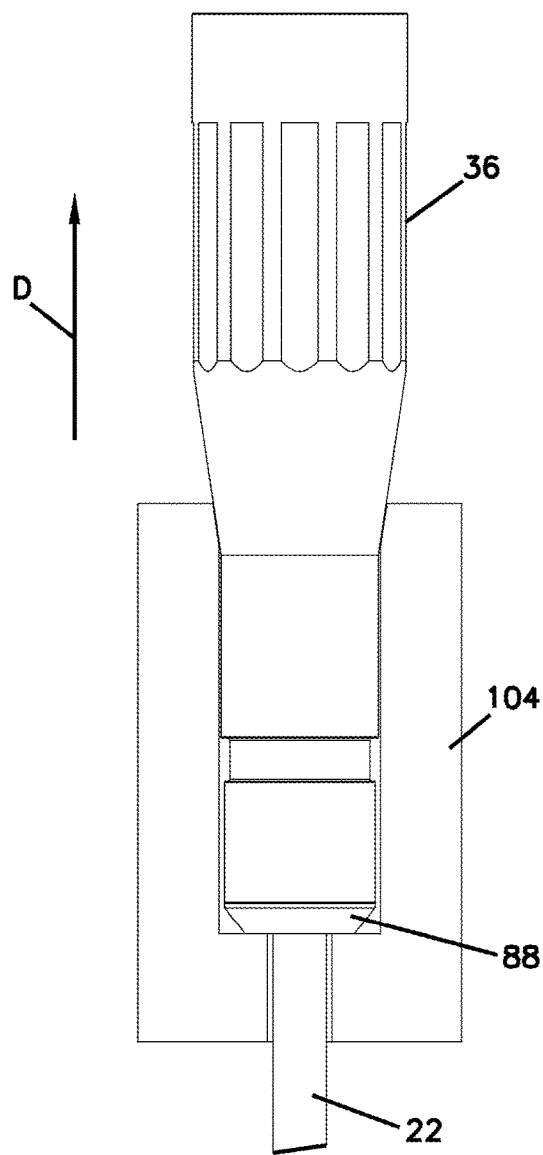
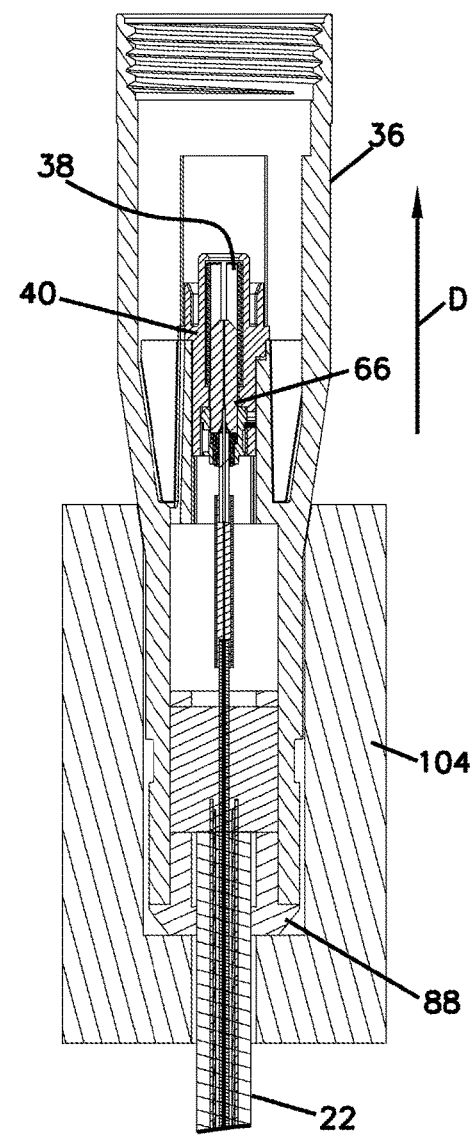

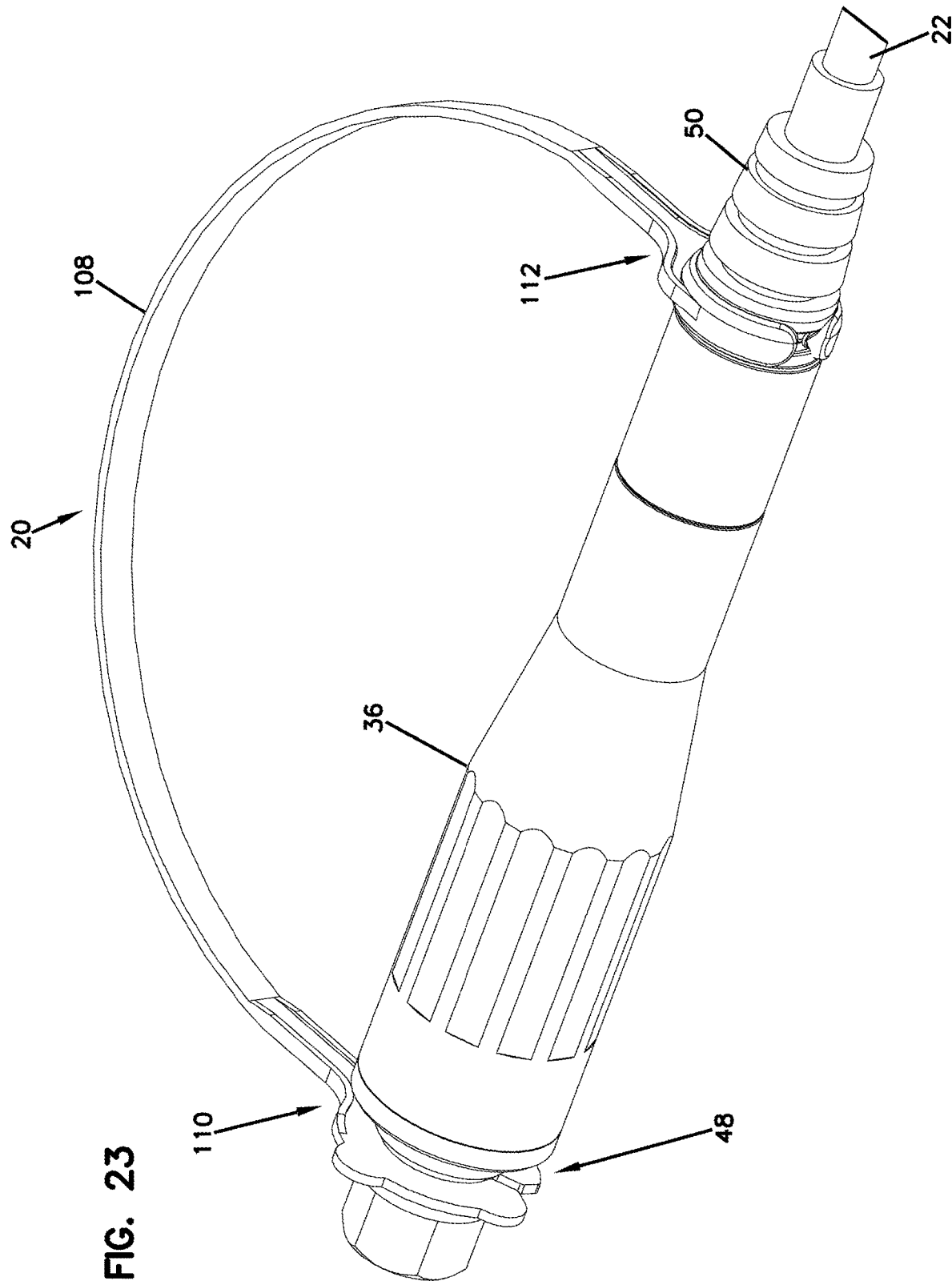

RUGGEDIZED FEMALE FIBER OPTIC CONNECTOR CABLE ASSEMBLY

CROSS-REFERENCE TO RELATED APPLICATION

This application is a continuation of U.S. patent application Ser. No. 16/085,430, filed on Sep. 14, 2018, now U.S. Pat. No. 10,502,907, which is a National Stage of PCT/US2017/022059, filed on Mar. 13, 2017, which claims the benefit of Chinese Patent Application No. 201610145037.2, filed on Mar. 14, 2016, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors and fiber optic connection systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected together without requiring a splice, and also allow such optical fibers to be easily disconnected from one another. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut or are in close proximity to one another and the ferrules are forced proximally relative to their respective connector housings against the bias of their respective springs. Ideally, the optical fibers of two connected fiber optic connectors are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter (see U.S. Pat. No. 5,317,663, which is hereby incorporated herein by reference) having a sleeve that receives and aligns the respective ferrules supporting the optical fibers desired to be optically coupled together.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by U.S. Pat. Nos. 7,467,896; 7,744,288 and 8,556,520.

Ruggedized fiber optic connection systems can include ruggedized female fiber optic connectors. Ruggedized female fiber optic connectors are typically adapted to mount at the end of a fiber optic cable and include a port adapted to receive a male ruggedized fiber optic connector. Example ruggedized female fiber optic connectors are disclosed by PCT International Publication Number WO2014/197894; PCT International Publication Number WO2014/167447; US Patent Application Publication Number 2014/0241670; and U.S. Pat. Nos. 7,428,366 and 7,686,519. Ruggedized female fiber optic connectors having more simplified constructions are needed.

SUMMARY

One aspect of the present disclosure relates to a ruggedized female fiber optic connector having a more simplified construction and a reduced number of parts as compared to prior art ruggedized female fiber optic connectors. Another aspect of the present disclosure relates to a ruggedized female fiber optic connector that is easier to assemble as compared to prior art ruggedized female fiber optic connectors. A further aspect of the present disclosure relates a ruggedized female fiber optic connector having a simplified fiber optic adapter that is mounted within a connector housing by loading the fiber optic adapter through a front of the connector housing. Still another aspect of the present disclosure relates to an adapter mounting configuration that enables front loading of a fiber optic adapter into a connector housing.

Another aspect of the present disclosure relates to an assembly adapted to couple to a ruggedized male fiber optic connector. The assembly includes a fiber optic cable including a jacket enclosing an optical fiber and at least one strength member. The assembly also includes a ruggedized female fiber optic connector coupled to an end of the fiber optic cable. The ruggedized female fiber optic connector includes a connector body having a length that extends along a central axis between a first end and an opposite second end. The optical fiber of the fiber optic cable enters the connector body through the first end of the connector body. The strength member of the fiber optic cable is anchored to the connector body at the first end of the connector body. The second end of the connector body defines a connector port for receiving the ruggedized male fiber optic connector. The connector body includes means adjacent the second end of the connector body for interlocking with a twist-to-lock coupler of the ruggedized male fiber optic connector. The ruggedized female fiber optic connector also includes a ferrule alignment sleeve co-axially aligned along the central axis. The ferrule alignment sleeve includes first and second opposite ends spaced apart along the central axis. The first end of the ferrule alignment sleeve faces toward the first end of the connector body and the second end of the ferrule alignment sleeve faces toward the second end of the connector body. The second end of the ferrule alignment sleeve is accessible through the connector port. The ruggedized female fiber optic connector also includes an alignment sleeve housing containing the ferrule alignment sleeve. The alignment sleeve housing is axially fixed within the connector body. The ruggedized female fiber optic connector further includes a ferrule assembly including a ferrule. The ferrule is received within the first end of the ferrule alignment sleeve and is axially fixed relative to the alignment sleeve housing. A section of optical fiber is supported within a longitudinal fiber passage of the ferrule. The section of optical fiber has an interface end positioned adjacent a free end of the ferrule. The section of optical fiber is optically coupled to the optical fiber of the fiber optic cable.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIGS. 5-6 are cross-sectional views of a second embodiment alignment sleeve housing in accordance with principles of the present disclosure;

FIGS. 15-23 illustrate a sequence of steps involved for assembling the assembly shown in FIG. 1.

DETAILED DESCRIPTION

Aspects of the present disclosure relate to ruggedized/ hardened fiber optic connection systems designed to reduce cost. In certain examples, a female ruggedized fiber optic connector is provided with a simple structure having a pre-assembled ferrule alignment sleeve including a ferrule. In the present disclosure, the ferrule is depicted as a single fiber ferrule. However, a multi-fiber ferrule that holds multiple fibers or a duplex fiber optic connector with multiple ferrules may also be used. In other embodiments, electrical contacts may also be used in addition to the ferrule for compatibility with a hybrid optical/electrical cable.

Another aspect of the present disclosure relates to an assembly that integrates features of a fiber optic connector and features of a fiber optic adapter into one assembly. From one perspective, the assembly can be considered as a fiber optic connector having fiber optic adapter functionality integrated therein. The assembly is configured to require a reduced number of parts as compared to systems having a separate fiber optic adapter that interconnects two separate fiber optic connectors that are each intended to be easily inserted into and removed from the fiber optic adapter (e.g., SC connectors, LC connectors, DLX™ connectors sold by TE Connectivity, OptiTap™ connectors sold by Corning Cable Systems, etc.) By integrating features of a fiber optic connector and a fiber optic adapter into one assembly, the total number of parts can be reduced thereby facilitating assembly operations and reducing cost.

Figure 1:
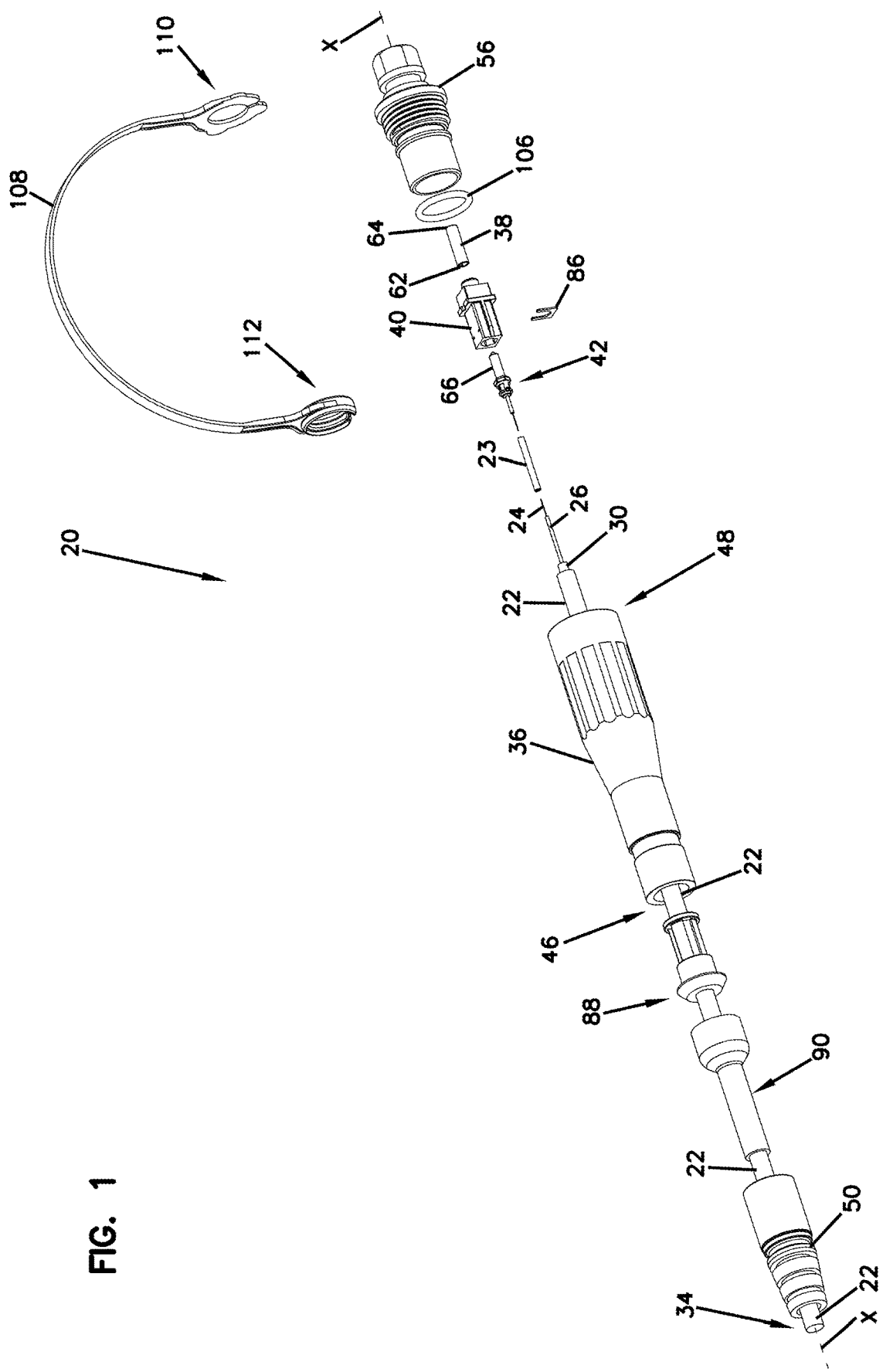
FIG. 1 depicts an exploded view of an example assembly including a ruggedized female fiber optic connector having features of inventive aspects in accordance with the principles of the present disclosure.
Figure 2:
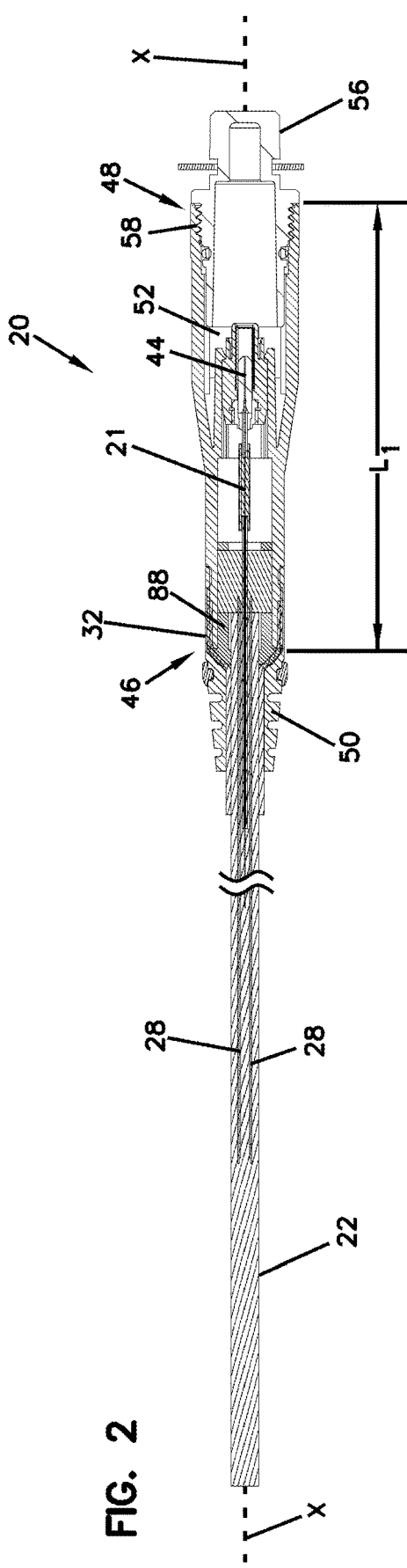
FIG. 2 is a perspective, cross-sectional view of the assembly of FIG. 1.
Figure 3:
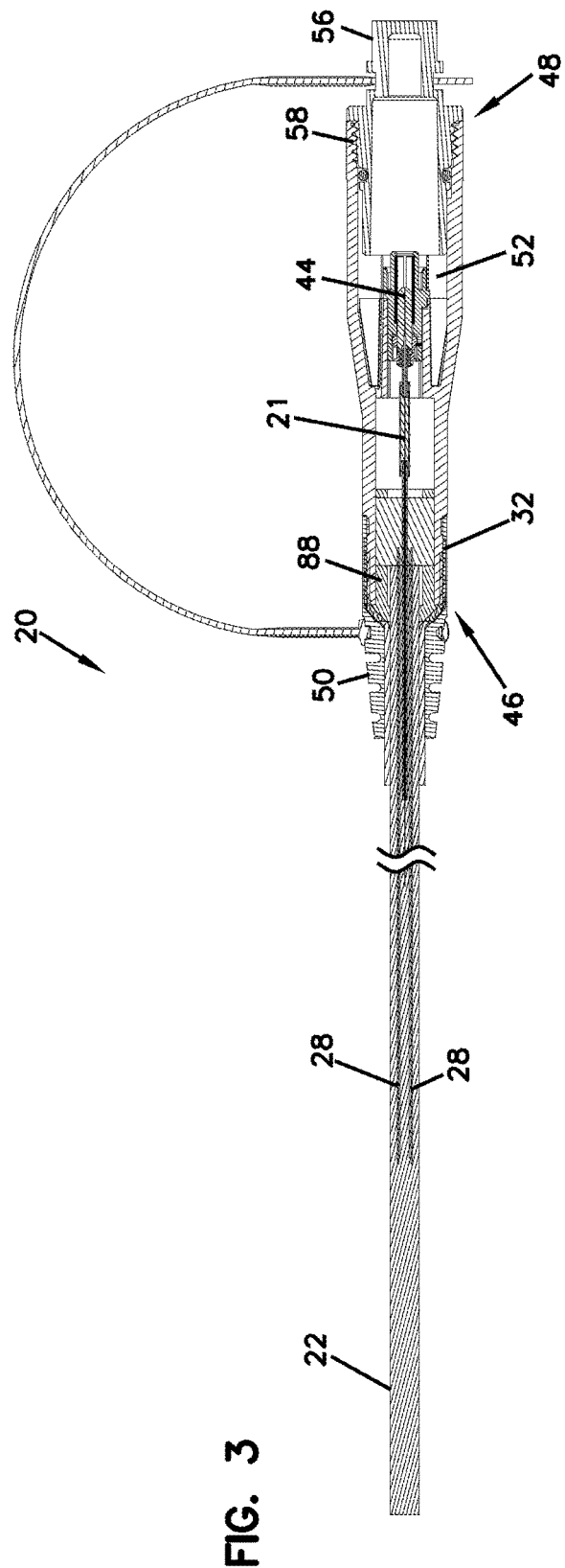
FIG. 3 is a perspective, cross-sectional view of the assembly of FIG. 1.

FIGS. 1-3 illustrate an assembly 20 in accordance with the principles of the present disclosure. The assembly 20 includes a fiber optic cable 22. The fiber optic cable 22 can include at least one optical fiber 24 capable of carrying optical signals. The optical fiber 24 includes a core surrounded by cladding. The core is the light-conducting central portion of the optical fiber 24. The cladding surrounds the core and is composed of a material having a lower index of refraction than the material of the core. Light is internally reflected within the core to transmit the optical signal along the core. The optical fiber can include a coating layer (e.g., acrylate) that protects the glass cladding and core. In some examples, the optical fiber 24, including the coating layer, can be protected within a buffer tube 26 (e.g., a tight or loose buffer tube). The fiber optic cable 22 can also include strength members 28 within the fiber optic cable 22 to increase the tensile strength of the fiber optic cable 22. Example strength members include flexible string-like reinforcement yarns such as fiberglass or aramid yarn that mostly provide tensile reinforcement. The strength members can also more rigid rods (e.g., metal rods such as steel rods or composite rods such as rods made of fiberglass roving reinforced polymer) that provide tensile and compressive reinforcement. The optical fiber 24, strength members 28, buffer tube 26 and other cable components can be surrounded by an outer jacket 30 or sheath that provides a protective covering for the cable components. In certain examples the cable can include a plurality of optical fibers. In certain examples, the cables can be hybrid cables that include both optical fibers for carrying optical signals and metal conductors for carrying electrical signals or power.

The assembly 20 includes a ruggedized female fiber optic connector 32 coupled to the fiber optic cable 22 at a distal end 34 thereof. The ruggedized female fiber optic connector 32 includes a connector body 36, a ferrule alignment sleeve 38, an alignment sleeve housing 40, a ferrule assembly 42, and a section of optical fiber 44.

The example connector body 36 is shown as a unitary one piece construction, although alternatives are possible. The connector body 36 can have a length $L_1$ that extends along a central axis X between a first end 46 and an opposite second end 48. The first end 46 of the connector body 36 is adapted to receive the fiber optic cable 22. In certain examples, a flexible boot 50 can be mounted over the interface between the fiber optic cable 22 and the first end 46 of the connector body 36. The strength members 28 of the fiber optic cable 22 can be anchored to the connector body 36 at the first end 46 thereof. For example, the strength members 28 of the fiber optic cable 22 can be adhesively bonded within the connector body 36 adjacent the first end 46 of the connector body 36.

Figure 13:
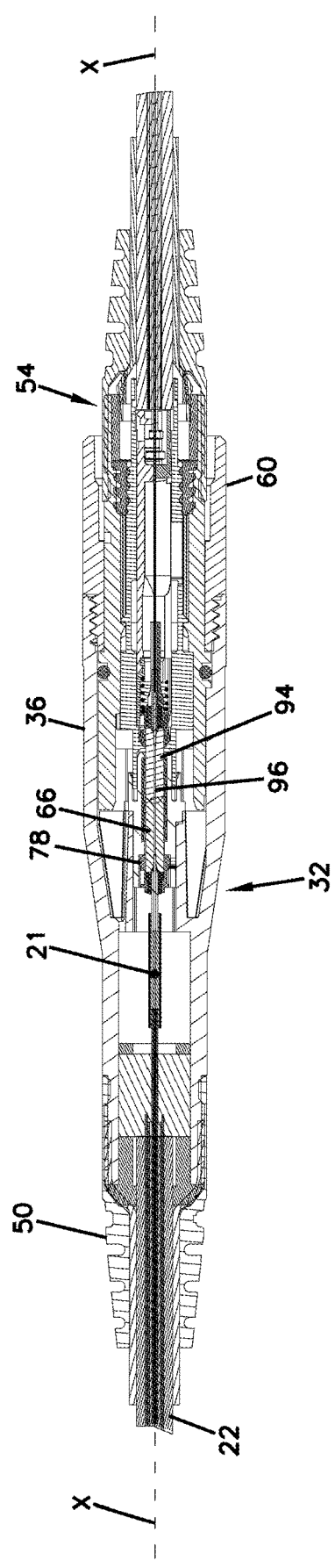
FIGS. 13-14 are cross-sectional views showing the ruggedized female fiber optic connector mated with a ruggedized male fiber optic connector.
Figure 14:
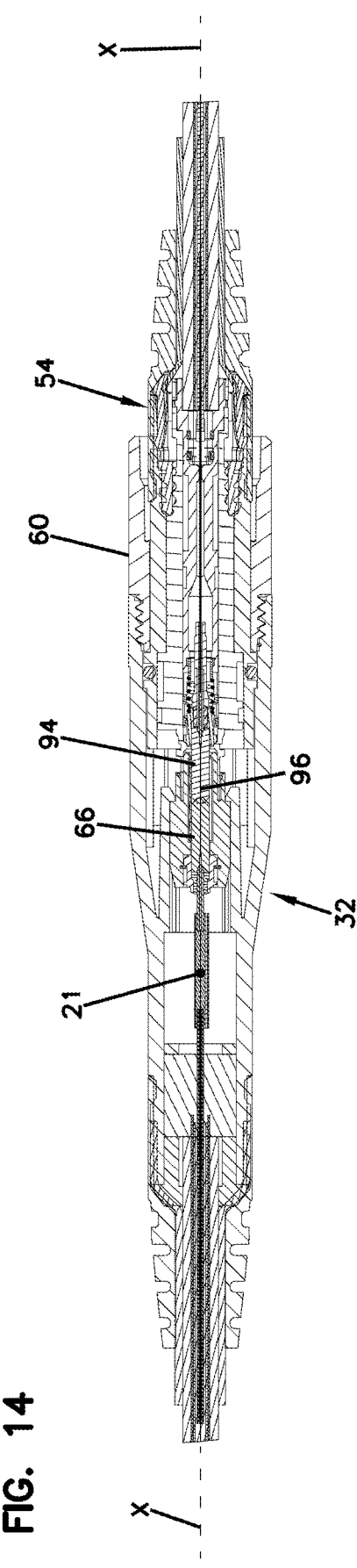

The second end 48 of the connector body 36 defines a connector port 52 sized to receive an external ruggedized male fiber optic connector 54 (see FIGS. 13-14). When the ruggedized female fiber optic connector 32 is not in use, the connector port 52 can receive a plug 56 (e.g. protective cap) that prevents dust, water or other contaminants from entering an interior of the connector body 36. The connector body 36 includes means 58 (e.g., a twist-to-lock interface such a threads or a bayonet style interface) adjacent the second end 48 of the connector body 36 for interlocking with a twist-to-lock coupler 60 (e.g., an exterior threaded nut, an internally threaded sleeve, a bayonet coupler, etc.) (see FIGS. 13-14) of the ruggedized male fiber optic connector 54. It will be appreciated that although a twist-to-lock interface is shown, alternatives are possible (e.g., snap fit, slide lock collars, etc.). The twist-to-lock coupler 60 engages the means 58 provided at the connector port 52 to secure the ruggedized male fiber optic connector 54 within the ruggedized female fiber optic connector 32.

Figure 4:
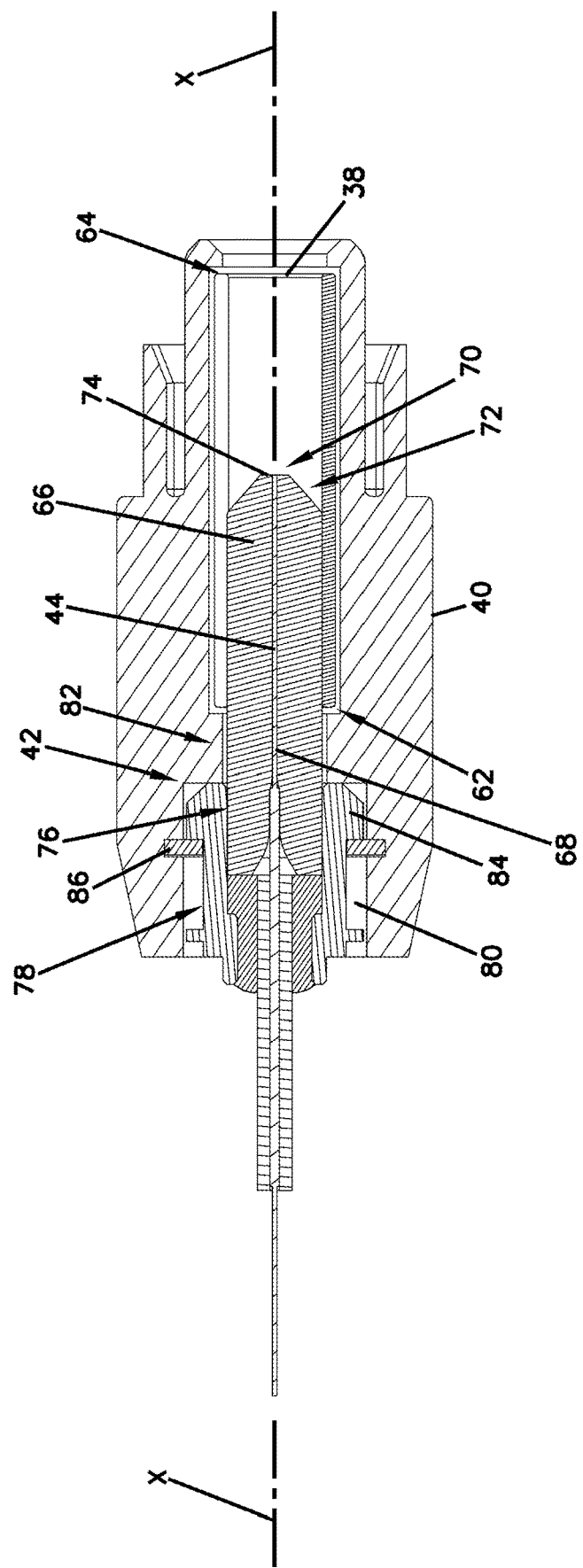
FIG. 4 is a cross-sectional view of a portion of the assembly shown in FIG. 1 that depicts one embodiment of an example alignment sleeve housing in accordance with the principles of the present disclosure.
Figure 7:
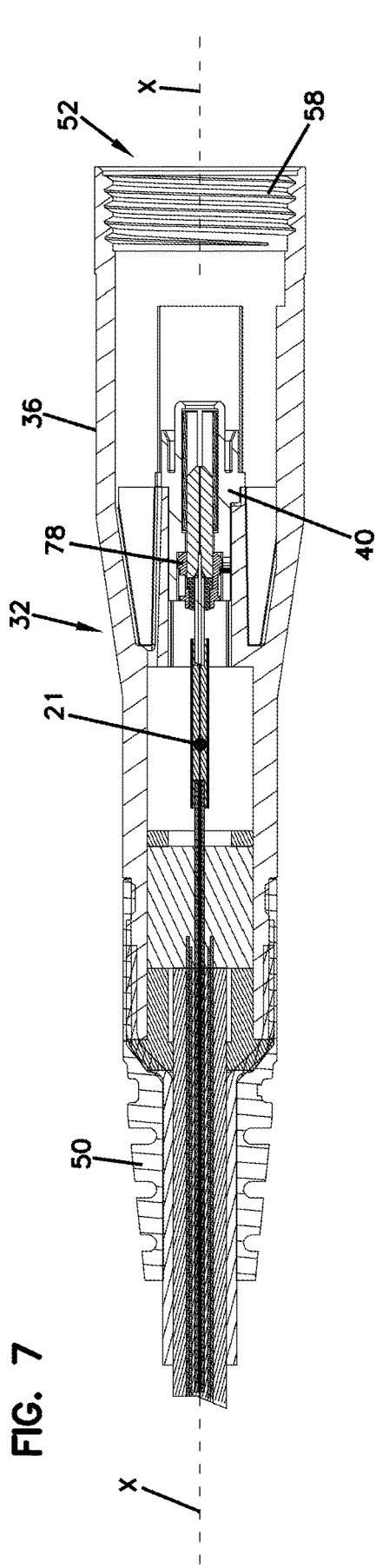
FIGS. 7-8 are cross-sectional views of the ruggedized female fiber optic connector shown in FIG. 1.
Figure 8:
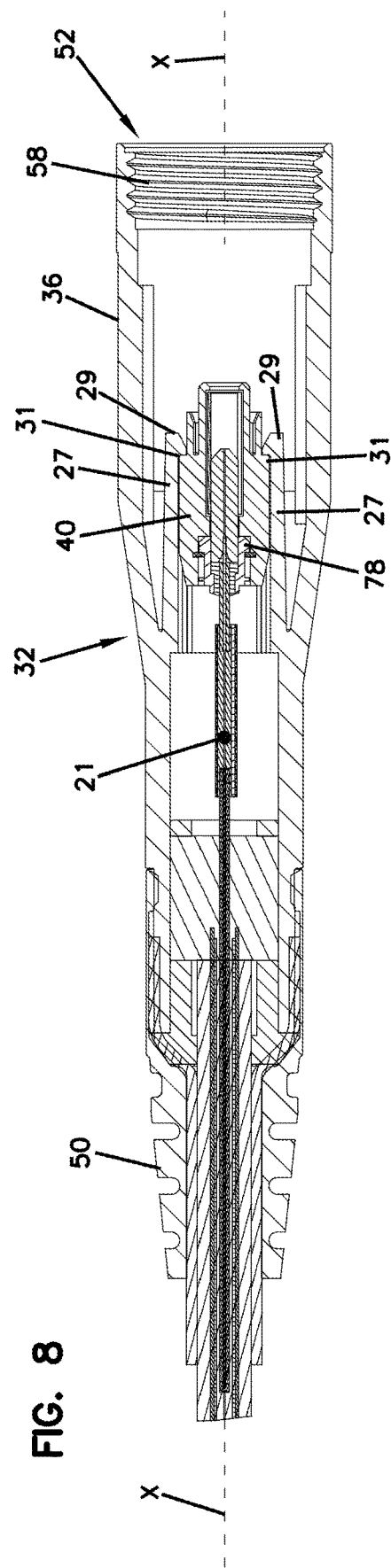
Figure 9:
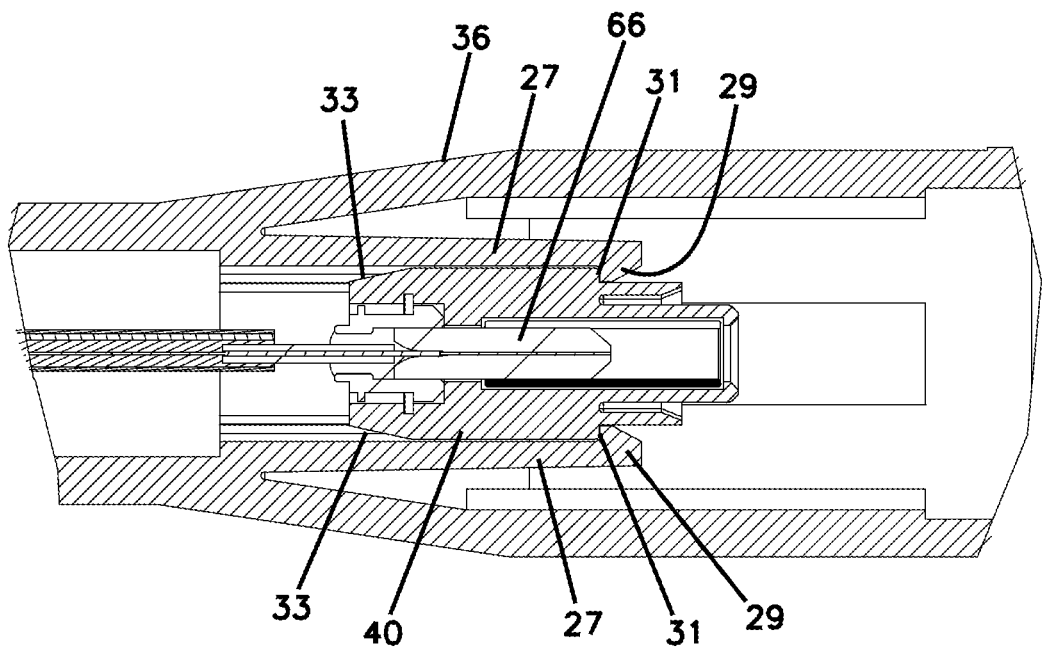
FIGS. 9-10 are cross-sectional views of a portion of the ruggedized female fiber optic connector shown in FIGS. 7-8.
Figure 10:
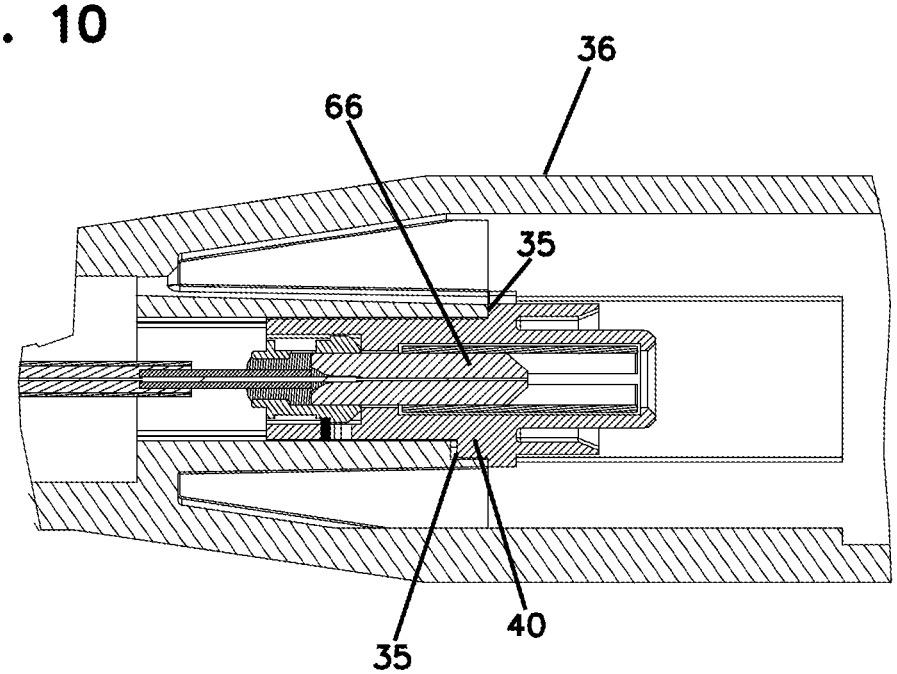

Referring to FIG. 4, the ferrule alignment sleeve 38 is co-axially aligned along the central axis X. The ferrule alignment sleeve 38 includes first and second opposite ends 62, 64 that are spaced apart along the central axis X. The first end 62 of the ferrule alignment sleeve 38 faces toward the first end 46 of the connector body 36 (see FIGS. 2 and 3). The second end 64 of the ferrule alignment sleeve 38 faces toward the second end 48 of the connector body 36 (see FIGS. 2 and 3). The second end 64 of the ferrule alignment sleeve 38 can be accessed through the connector port 52. The ferrule alignment sleeve 38 is mounted within the alignment sleeve housing 40. As is known in the art, the ferrule alignment sleeve 38 is free to float slightly within the alignment sleeve housing 40.

The ferrule alignment sleeve 38 can be a cylindrical split-sleeve. The ferrule alignment sleeve 38 can be made of a resilient material such as a metal material (e.g., steel, phosphorous bronze, zirconia). When configured in as a cylindrical split-sleeve, the ferrule alignment sleeve 38 can have a split sleeve one longitudinal slit defined through the ferrule alignment sleeve 38 to allow the ferrule alignment sleeve 38 to elastically flex open upon receipt of a ferrule therein. It will be appreciated that the ferrule alignment sleeve 38 has an elastic construction that allows the ferrule alignment structure 38 to flex open to receive in internal ferrule (e.g., ferrule 66) at the first end 62 as well as a ferrule corresponding to the ruggedized male fiber optic connector 54 at the second end 64. The ferrule alignment sleeve 38 functions to coaxially align the internal ferrule with the ferrule of the ruggedized male fiber optic connector 54 along the central axis X. In this way, an optical coupling can be provided between optical fibers held by the ferrules. In certain examples, the ferrule alignment sleeve 38 can be manufactured of a material such as Zirconia Ceramic, Phosphor Bronze, plastic materials, and other materials having suitable elastic characteristics.

In the depicted example, the ferrule assembly 42 includes the ferrule 66. The ferrule 66 can be inserted or received within the first end 62 of the ferrule alignment sleeve 38. The ferrule 66 can be axially fixed relative to the alignment sleeve housing 40 such that when the ruggedized female fiber optic connector 32 is mated with the ruggedized male fiber optic connector 54 the ferrule 66 does not move axially relative to the alignment sleeve housing 40 along the central axis X. The ferrule 66 is mounted relative to the alignment sleeve housing 40 without the use of a spring that biases the ferrule 66 toward the connector port 52. As such, the ferrule 66 is not free to move back against a bias of a spring along the central axis X when the ruggedized male fiber optic connector 54 is mated with the ruggedized female fiber optic connector 32. The ferrule alignment sleeve 38 aligns the ferrule 66 such that an optical fiber within the ferrule 66 is coaxially aligned along the central axis X.

The section of optical fiber 44 can be supported within a longitudinal fiber passage 68 of the ferrule 66. In certain examples, the section of optical fiber 44 can be unitary with the optical fiber 24 of the fiber optic cable 22 (e.g., directly terminated). In other examples, the section of optical fiber 44 can be spliced to the optical fiber 24 of the fiber optic cable 22 at a splice location 21 (see FIG. 2) within the connector body 36. The splice location 21 can be closely located relative to the ferrule 66 thereby allowing the length of the connector body 36 to be relatively short. The splice can be protected by a shape memory sleeve 23 (see FIG. 1) such as, but not limited to, a heat shrink sleeve that contains adhesive. The section of optical fiber 44 can have an interface end 70 positioned adjacent a free end 72 of the ferrule 66. In one example, the interface end 70 of the section of optical fiber 44 can be flush relative to an end face 74 of the ferrule 66 at the free end 72 of the ferrule 66. In other examples, the interface end 70 of the section of optical fiber 44 can be recessed relative to the end face 74 of the ferrule 66 at the free end 72 of the ferrule 66. In certain examples, the interface end 70 of the section of optical fiber 44 can protrude relative to the end face 74 of the ferrule 66 at the free end 72 of the ferrule 66. The section of optical fiber 44 can be optically coupled to the optical fiber 24 of the fiber optic cable 22.

A base end 76 of the ferrule 66 can be secured within a ferrule hub 78. The ferrule hub 78 can be fixed in place relative to the alignment sleeve housing 40. The alignment sleeve housing 40 defines a receptacle 80 for receiving the ferrule hub 78. The alignment sleeve housing 40 further defines a radial shoulder 82 between the receptacle 80 and the ferrule alignment sleeve 38. The ferrule hub 78 can include a radial flange 84 that can be axially captured within the receptacle 80 between the radial shoulder 82 and a fastener 86 secured within the receptacle 80. In one example, the fastener 86 can be a spring clip (e.g., snap ring). In another embodiment shown in FIGS. 5-6, the fastener 86 can be a stopper plug snapped or threaded within the receptacle 80.

The radial flange 84 of the ferrule hub 78 may have a hexagon shape. The alignment sleeve housing 40 may have features that include a hexagon shape. The radial flange 84 can includes a series of flats used for indexing or otherwise rotationally positioning the ferrule 66 in the alignment sleeve housing 40. The radial flange 84 of the ferrule hub 78 and the receptacle 80 of the alignment sleeve housing 40 can have mating geometries that define multi-sided transverse cross-sectional shapes (e.g., hexagonal) that allow the ferrule 66 to be mounted at a desired rotatable position. The mating geometries can also prevent the ferrule hub 78 from rotating about the central axis X relative to the alignment sleeve housing 40. In one example, the mating geometries include at least one set of opposing flats. The mating geometries allow the ferrule assembly 42 to be set at a selected one of a plurality of different rotational positions relative to the alignment sleeve housing 40 to allow for tuning (i.e., positioning a core offset of the optical fiber at a desired rotational position about the axis X). Indicia can be provided on one of the flats so as to indicate a tuned position (e.g., core offset) of the optical fiber 24 within the ferrule 66. In this way, the ferrule 66 can be rotationally oriented within the alignment sleeve housing 40 taking tuning into consideration. Thus, the hex shape of the ferrule hub 78 and receptacle 80 of the alignment sleeve housing 40 allows tuning by allowing core offset to be oriented at a desired position.

Although the ferrule 66 is shown as a single fiber ferrule, it will be appreciated that the ferrule 66 can be a multi-fiber ferrule that holds multiple fibers or a duplex connector with multiple ferrules. In other embodiments, in addition to a ferrule, electrical contacts may be used for compatibility with a hybrid optical/electrical cable.

Referring to FIGS. 7-10, the alignment sleeve housing 40 can be axially fixed within the connector body 36 such that when the ruggedized female fiber optic connector 32 is mated with the ruggedized male fiber optic connector 54, the alignment sleeve housing 40 does not move axially relative to the connector body 36 along the central axis X. In certain examples, the alignment sleeve housing 40 can be secured within the connector body 36 by a snap fit connection. In other examples, the alignment sleeve housing 40 can be secured within the connector body 36 by a threaded connection. In one example, the alignment sleeve housing 40 can be adhesively bonded within the connector body 36.

In certain examples, the connector body 36 can include resilient latches 27 having tabs 29 that snap-fit with corresponding shoulders 31 defined by the alignment sleeve housing 40. In this manner, when the alignment sleeve housing 40 is inserted into the second end 48 of the connector body 36, the flexible latches 27 ride along tapered ramp surfaces 33 and flex outwardly causing the tabs 29 to snap and engage the corresponding shoulders 31 (see FIG. 9) thereby securing the alignment sleeve housing 40 within the connector body 36. The alignment sleeve housing 40 abuts stops 35 (see FIG. 10) on top and bottom sides of the connector body 36 to prevent the alignment sleeve housing 40 from being inserted too far.

Turning again to FIG. 1, the assembly 20 can include a rear end cap 88 and a heat shrink sleeve 90. The rear end cap 88 is mounted within the first end 46 of the connector body 36. The fiber optic cable 22 passes through the rear end cap 88. The rear end cap 88 helps to prevent epoxy leakage during epoxy injection to secure strength members of the cable to the connector body 36 and reduces the amount of epoxy used. In one example, the rear end cap 88 may be made of plastic or metal, although alternatives are possible. For example, the metal may be aluminum with good heat conductivity to heat cure the epoxy which can provide for a simple assembly. The heat shrink sleeve 90 provides a seal between the outer jacket 30 of the fiber optic cable 22 and the first end 46 of the connector body 36. The flexible boot 50 can be mounted over the heat shrink sleeve 90 at an interface between the fiber optic cable 22 and the connector body 36.

Figure 11:
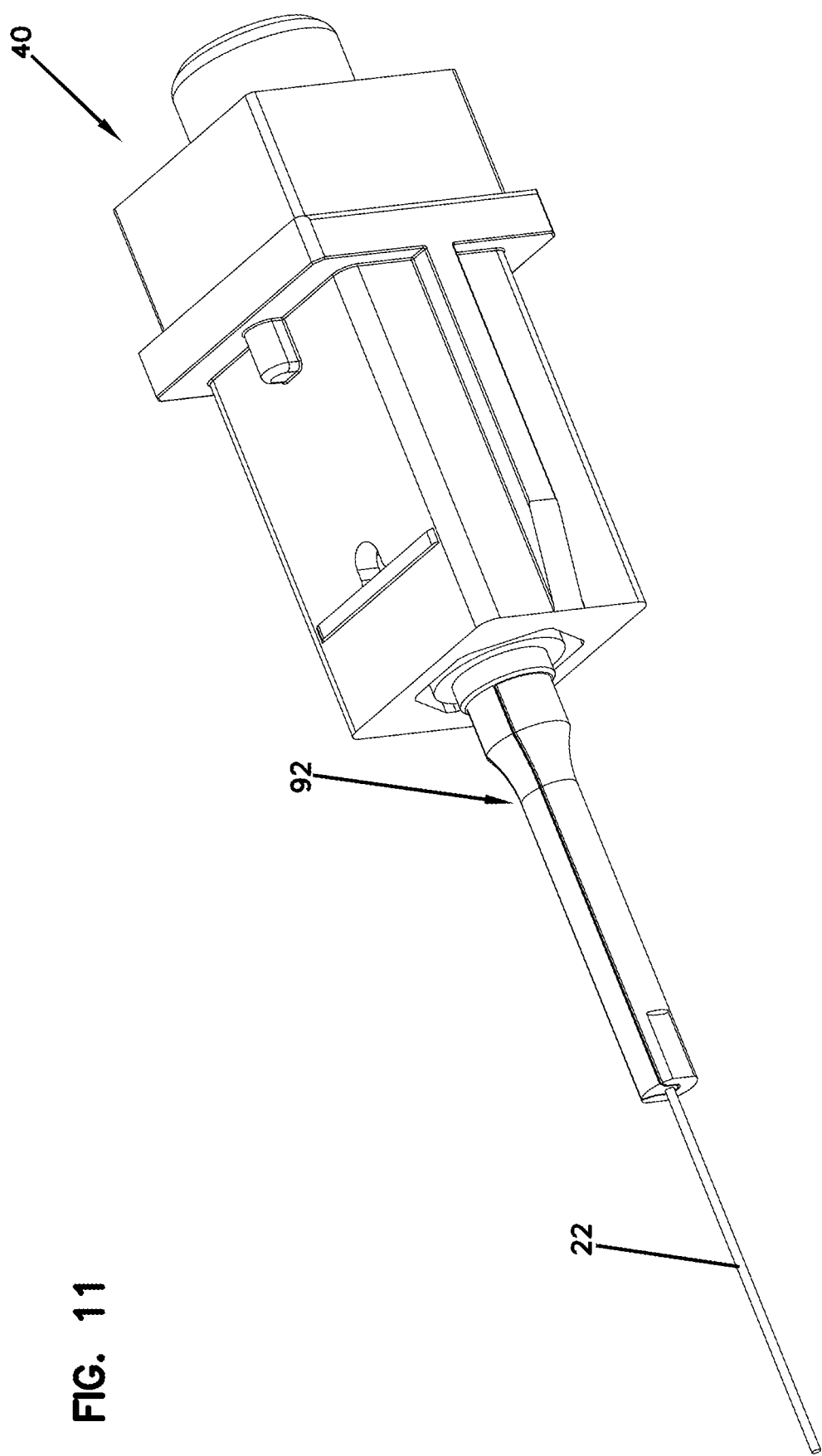
FIG. 11 is a perspective view of the alignment sleeve housing shown in FIG. 1 depicting an example sleeve in accordance with the principles of the present disclosure.
Figure 12:
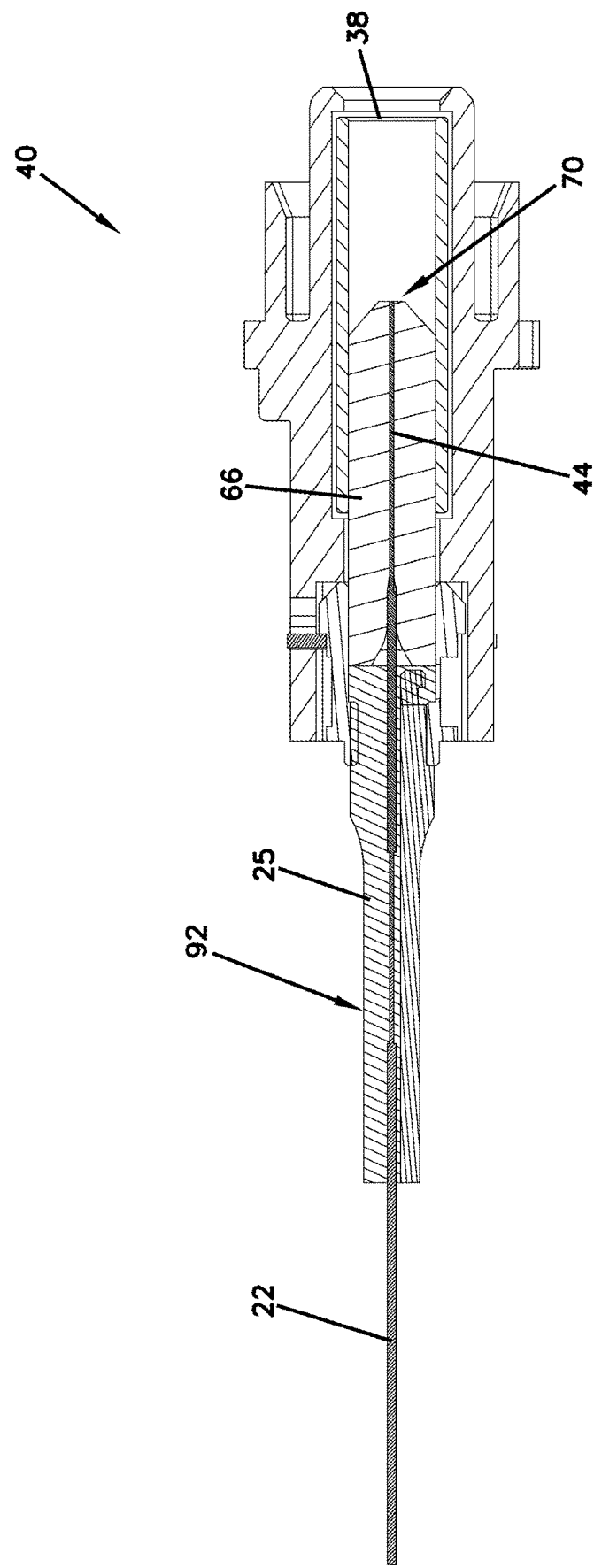
FIG. 12 is a cross-sectional view of the alignment sleeve housing and sleeve shown in FIG. 11.

Referring to FIGS. 11-12, a U-groove holder 92 (e.g., sleeve) is depicted as an alternate splice protector which contains adhesive 25 to protect the splicing point. The U-groove holder 92 is assembled into the ferrule hub 78 and can provide the same benefits as the shape memory sleeve 23.

Referring to FIGS. 13-14, the assembly 20 is shown coupled to the ruggedized male fiber optic connector 54. The ruggedized male fiber optic connector 54 includes a ferrule 94 positioned within the second end 48 of the connector body 36. When the ruggedized male fiber optic connector 54 is inserted into the connector port 52, the ferrule 94 of the ruggedized male fiber optic connector 54 is received within the second end 64 of the ferrule alignment sleeve 38 such that an optical connection is provided between the ruggedized female fiber optic connector 32 and the ruggedized male fiber optic connector 54. The ferrule alignment sleeve 38 coaxially aligns the ferrule 94 of the ruggedized male fiber optic connector 54 with the ferrule 66 within the ruggedized female fiber optic connector 32. In this way, an optical connection is made between an optical fiber 96 supported by the ferrule 94 of the ruggedized male fiber optic connector 54 and the optical fiber 24 of the fiber optic cable 22 anchored to the ruggedized female fiber optic connector 32.

In the depicted embodiment, the ruggedized female fiber optic connector 32 and the ruggedized male fiber optic connector 54 are adapted for outside environmental use. For example, the ruggedized female fiber optic connector 32 and the ruggedized male fiber optic connector 54 can include environmental seals (e.g., an annular seal such as an O-ring, a face seal, a radial seal etc.) for preventing moisture/water intrusion. The environmental seals can provide environmental sealing between the mated ruggedized male and female fiber optic connectors 32, 54.

Figure 15:
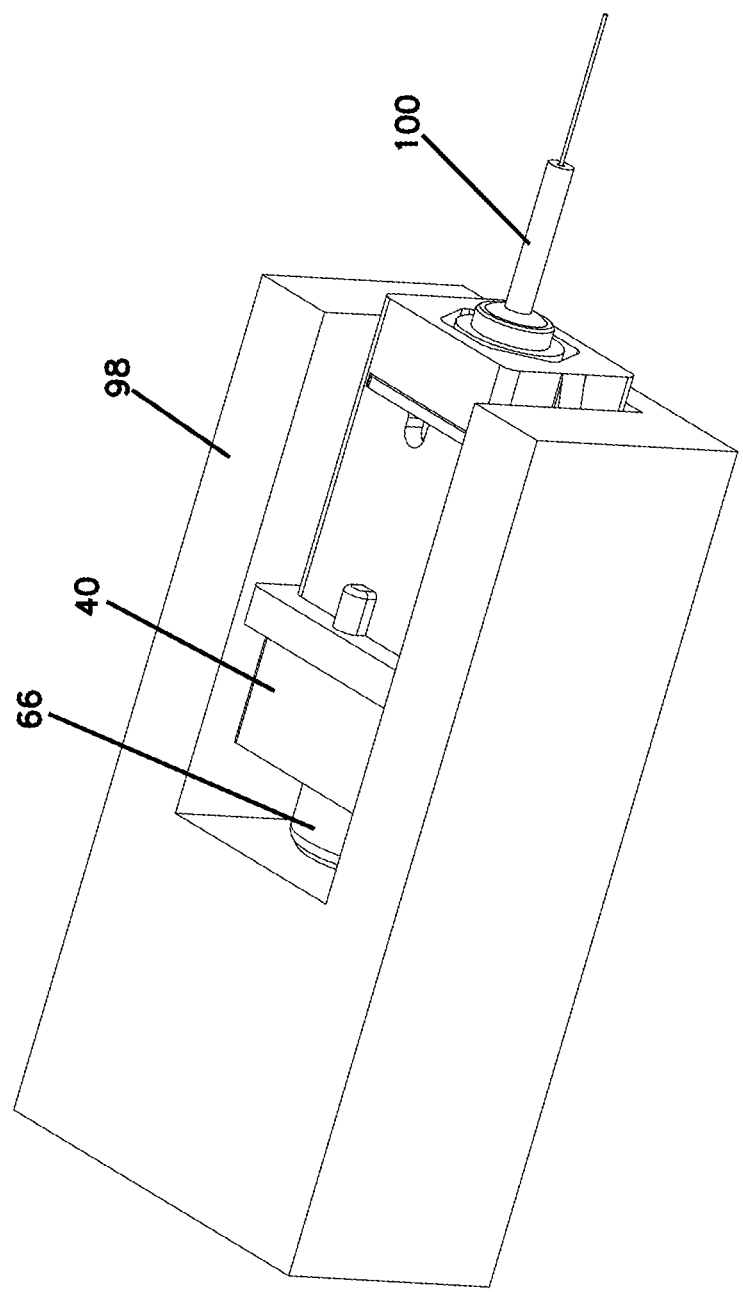
Figure 16:
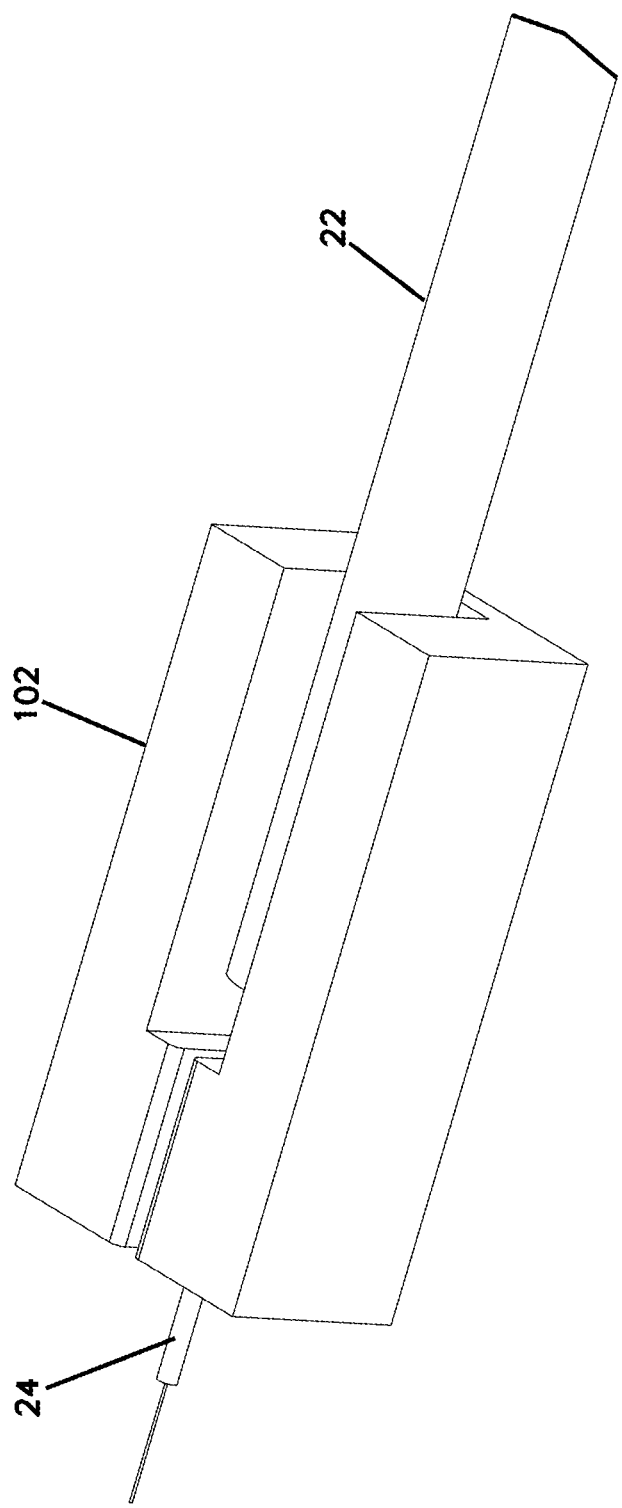
Figure 17:
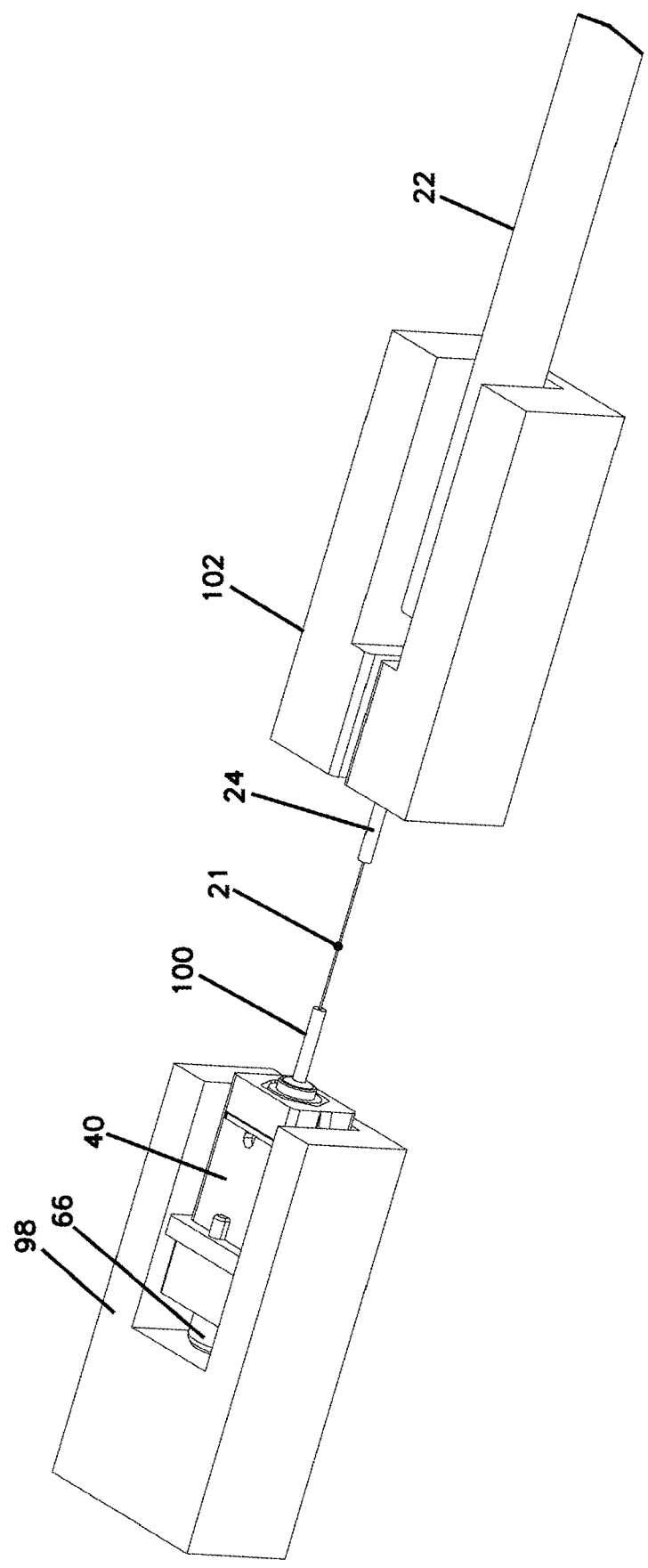
Figure 18:
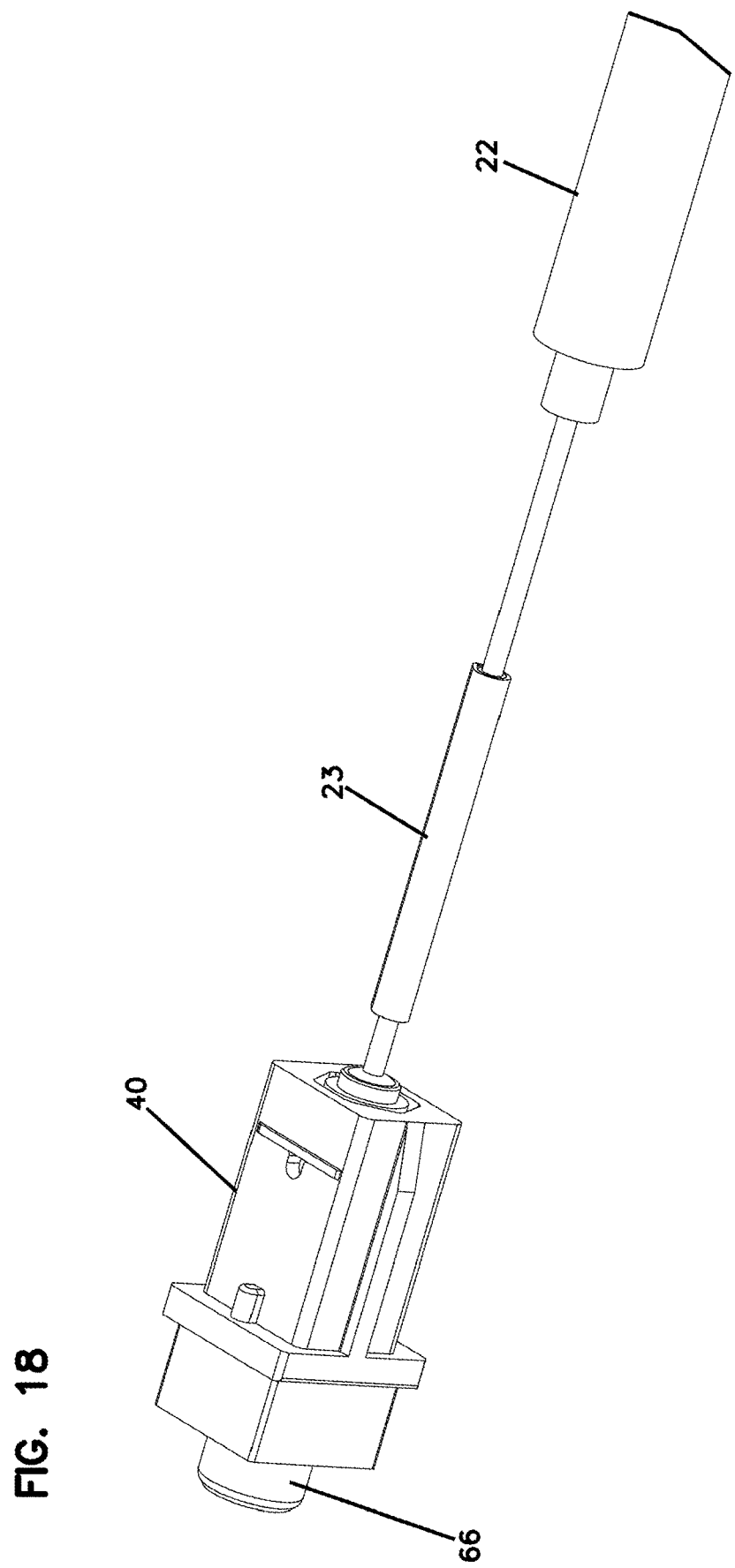
Figure 19:
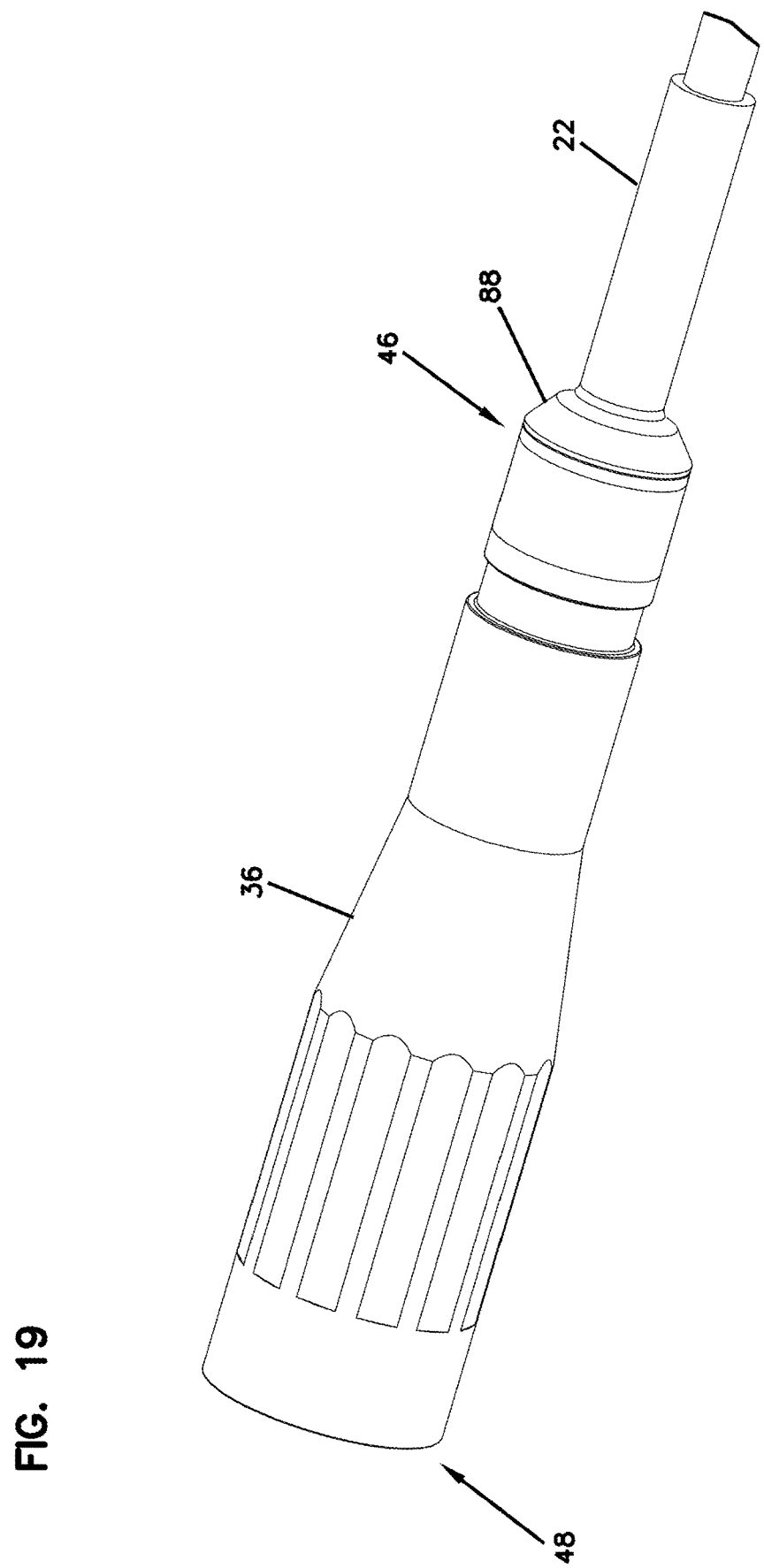

FIGS. 15-23 illustrate a series of process steps for assembling the assembly 20 of FIG. 1. Referring to FIG. 15, the alignment sleeve housing 40 is placed into a first adapter 98 where an optical fiber stub 100 is stripped and cleaved. In FIG. 16, the fiber optic cable 22 is shown mounted in a second adapter 102 where the optical fiber 24 (e.g., incoming fiber) is stripped and cleaved. It will be appreciated that the first and second adapters 98, 102 are not components of the assembly 20 and can be disposable. FIG. 17 shows the optical fiber 24 fusion spliced to the optical fiber stub 100 at the splice location 21. FIG. 18 shows the first and second adapters 98, 102 removed. The shape memory sleeve 23 has been mounted over the splice location 21 to protect the splice. FIG. 19 shows the alignment sleeve housing 40 loaded within the connector body 36. The rear end cap 88 is mounted within the first end 46 of the connector body 36.

The connector body 36 and rear end cap 88 can be loaded into a fixture 104 such that the connector body 36 is oriented in a vertical direction D as shown in FIGS. 20 and 21. Epoxy or adhesive can be injected into the connector body 36 to bond strength members 28 within the connector body and thereby anchor (e.g., fix) the fiber optic cable 22 to the connector body. The adhesive can be heat cured.

Figure 22:
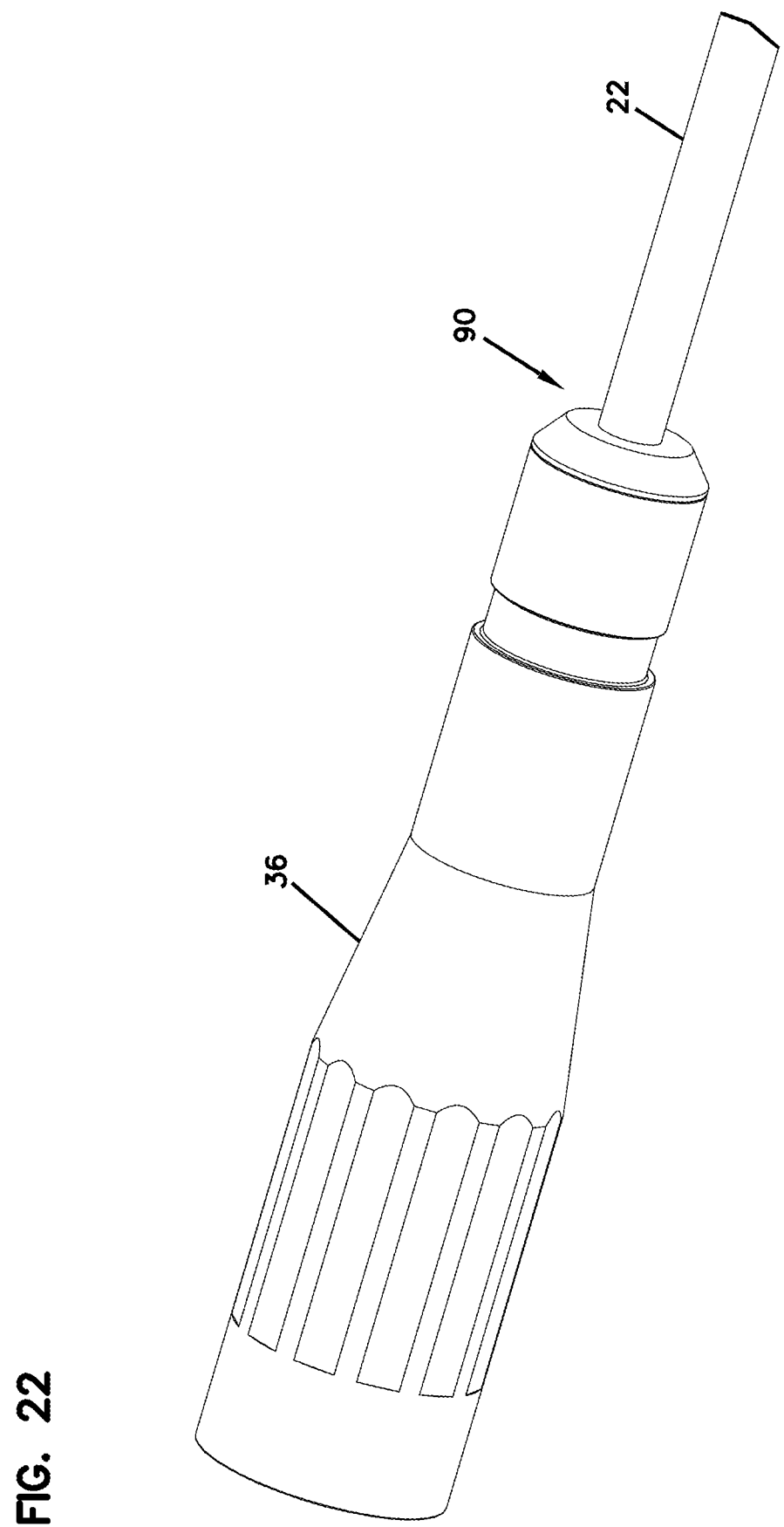

An optional heat shrink sleeve 90 can be mounted over the rear end cap 88 as shown in FIG. 22. The heat shrink sleeve 90 is heated to shrink onto the fiber optic cable 22 and the connector body 36 to seal the first end 46 of the connector body 36 with the fiber optic cable 22.

FIG. 23 shows the flexible boot 50 mounted over the interface between the fiber optic cable 22 and the first end 46 of the connector body 36 for reinforcement. A plug 56 (with O-ring 106 (see FIG. 1) already assembled on) is shown attached at the second end 48 of the connector body 36. A tether 108 is shown with a first end 110 attached about the plug 56 and a second end 112 attached about the flexible boot 50.

From the forgoing detailed description, it will be evident that modifications and variations can be made without departing from the spirit and scope of the disclosure.

PARTS LIST

20 Assembly
21 Splice location
22 Fiber optic cable
23 Shape memory sleeve
24 Optical fiber
25 Adhesive
26 Buffer tube
27 Latches
28 Strength members
29 Tabs
30 Outer jacket
31 Shoulders 32 Ruggedized female fiber optic connector
33 Tapered ramp surfaces
34 Distal end
35 Stops
36 Connector body
38 Ferrule alignment sleeve
40 Alignment sleeve housing
42 Ferrule assembly
44 A section of optical fiber
46 First end
48 Second end
50 Flexible boot
52 Connector port
54 Ruggedized male fiber optic connector
56 Plug
58 Means
60 Twist-to-lock coupler
62 First end
64 Second end
66 Ferrule
68 Longitudinal fiber passage
70 Interface end
72 Free end
74 End face
76 Base end
78 Ferrule hub
80 Receptacle
82 Radial shoulder
84 Radial flange
86 Fastener
88 Rear end cap
90 Heat shrink sleeve
92 U-groove holder
94 Ferrule
96 Optical fiber
98 First adapter
100 Optical fiber stub
102 Second adapter
104 Fixture
106 O-ring
108 Tether
110 First end
112 Second end

What is claimed is:

1. An assembly adapted to couple to a ruggedized male fiber optic connector, the assembly comprising:
a fiber optic cable including a jacket enclosing an optical fiber and at least one strength member; and
a ruggedized female fiber optic connector coupled to an end of the fiber optic cable, the ruggedized female fiber optic connector having a length that extends along a central axis between a first end and an opposite second end, the optical fiber of the fiber optic cable entering the ruggedized female fiber optic connector through the first end thereof, the at least one strength member of the fiber optic cable being secured to the ruggedized female fiber optic connector at the first end of the ruggedized female fiber optic connector, and the second end of the ruggedized female fiber optic connector defining a connector port for receiving the ruggedized male fiber optic connector, the ruggedized female fiber optic connector comprising:
a ferrule alignment sleeve co-axially aligned along the central axis, the ferrule alignment sleeve being accessible through the connector port;
an alignment sleeve housing containing the ferrule alignment sleeve, the alignment sleeve housing being axially fixed within a connector body;
a ferrule assembly including a ferrule, the ferrule being axially fixed relative to the alignment sleeve housing; and
a section of optical fiber supported within a longitudinal fiber passage of the ferrule, the section of optical fiber being optically coupled to the optical fiber of the fiber optic cable.

2. The assembly of claim 1, wherein the ruggedized female fiber optic connector does not include a spring such that the ferrule is not spring biased along the central axis.

3. The assembly of claim 1, wherein the ruggedized female fiber optic connector includes means adjacent the second end of the ruggedized female fiber optic connector for interlocking with a twist-to-lock coupler of the ruggedized male fiber optic connector.

4. The assembly of claim 1, further comprising a ferrule hub secured to a base end of the ferrule, the ferrule hub being fixed in place relative to the alignment sleeve housing.

5. The assembly of claim 4, wherein the ferrule hub includes a radial flange, wherein the alignment sleeve housing defines a receptacle for receiving the ferrule hub, wherein the alignment sleeve housing defines a radial shoulder between the receptacle and the alignment sleeve housing, wherein the radial flange of the ferrule hub is axially captured within the receptacle between the radial shoulder and a fastener secured within the receptacle.

6. The assembly of claim 5, wherein the fastener is a snap ring.

7. The assembly of claim 5, wherein the fastener is a stopper plug snapped or threaded within the receptacle.

8. The assembly of claim 4, wherein the ferrule hub and the receptacle have mating geometries that prevent the ferrule hub from rotating about the central axis relative to the alignment sleeve housing.

9. The assembly of claim 8, wherein the mating geometries include at least one set of opposing flats.

10. The assembly of claim 8, where the mating geometries allow the ferrule assembly to be set at a selected one of a plurality of different rotational positions relative to the alignment sleeve housing to allow for tuning.

11. The assembly of claim 8, wherein the mating geometries define hexagonal transverse cross-sectional shapes.

12. The assembly of claim 1, wherein the ruggedized female fiber optic connector has a unitary one piece construction.

13. The assembly of claim 1, wherein a rear end cap is mounted within the first end of the ruggedized female fiber optic connector.

14. The assembly of claim 1, wherein the alignment sleeve housing is secured within the ruggedized female fiber optic connector by snap fit connection.

15. The assembly of claim 1, wherein the alignment sleeve housing is secured within the ruggedized female fiber optic connector by adhesive.

16. The assembly of claim 1, wherein the alignment sleeve housing is loaded into the ruggedized female fiber optic connector through the connector port.

17. The assembly of claim 1, wherein the section of optical fiber has an interface end positioned adjacent a free end of the ferrule.

18. The assembly of claim 17, wherein the section of optical fiber supported by the ferrule is unitary with the optical fiber of the cable.

19. The assembly of claim 17, wherein the section of optical fiber supported by the ferrule is spliced to the optical fiber of the cable at a location within the ruggedized female fiber optic connector.

20. The assembly of claim 19, wherein the splice is protected by a shape memory sleeve such as a heat shrink sleeve that contains adhesive.

* * * * *